(12) United States Patent
Le Goaller

(10) Patent No.: US 7,772,563 B2
(45) Date of Patent: Aug. 10, 2010

(54) GAMMA IMAGERY DEVICE

(75) Inventor: Christophe Le Goaller, Villeneuve les Avignon (FR)

(73) Assignee: Commissariat a l'Energie Atomique, Paris (FR)

( * ) Notice: Subject to any disclaimer, the term of this patent is extended or adjusted under 35 U.S.C. 154(b) by 281 days.

(21) Appl. No.: 11/793,074

(22) PCT Filed: Dec. 12, 2005

(86) PCT No.: PCT/FR2005/051072

§ 371 (c)(1),
(2), (4) Date: Jun. 14, 2007

(87) PCT Pub. No.: WO2006/090035

PCT Pub. Date: Aug. 31, 2006

(65) Prior Publication Data

US 2008/0135767 A1 Jun. 12, 2008

(30) Foreign Application Priority Data

Dec. 14, 2004 (FR) .................................. 04 52962

(51) Int. Cl.
*G01T 1/16* (2006.01)
(52) U.S. Cl. ................................. 250/390.09
(58) Field of Classification Search ............ 250/363.02, 250/363.09, 363.1, 370.09; 378/206, 205, 378/63
See application file for complete search history.

(56) References Cited

U.S. PATENT DOCUMENTS 4,205,229 A * 5/1980 Frosch et al. ................ 250/352
5,371,370 A * 12/1994 Lightfoot ................ 250/363.02
6,187,018 B1 * 2/2001 Sanjay-Gopal et al. ....... 606/130
6,495,834 B1 12/2002 Corvo et al. ............. 250/363.1
6,782,123 B1 * 8/2004 Guillon et al. .............. 382/154
6,815,687 B1 * 11/2004 Branch-Sullivan et al. .. 250/389
6,843,599 B2 * 1/2005 Le et al. ..................... 378/198
7,274,020 B1 * 9/2007 Hindi et al. ............ 250/363.01
7,388,205 B1 * 6/2008 Verbinski et al. ......... 250/358.1
2004/0210132 A1 * 10/2004 Manjeshwar ................ 600/436

FOREIGN PATENT DOCUMENTS

EP 0542561 A1 5/1993
EP 0743538 A2 11/1996
EP 0743538 A3 11/1996

OTHER PUBLICATIONS

International Seach Report, PCT/FR2005/051072, 2 pgs, (Apr. 20, 2006).
International Preliminary Search Report, FA 657734 and FR 0452962, 2 pgs, (Jun. 27, 2005).

* cited by examiner

*Primary Examiner*—David P Porta
*Assistant Examiner*—Djura Malevic
(74) *Attorney, Agent, or Firm*—Nixon Peabody LLP

(57) ABSTRACT

This device is a gamma imagery device including:
  a gamma camera with an observation field,
  a gamma spectrometry detector collimated with a collimator with an observation field extending around an axis and that is included in the observation field of the gamma camera beyond a given distance from it;
  a laser pointer with a line of sight, this laser pointer being located close to the gamma spectrometry collimator, such that the line of sight is substantially parallel to the axis of the observation field of the collimator and intersects the observation field of the collimator,
  means for localising a zone pointed at by the laser pointer.

15 Claims, 1 Drawing Sheet

GAMMA IMAGERY DEVICE

CROSS REFERENCE TO RELATED APPLICATIONS OR PRIORITY CLAIM

This application is a national phase of International Application No. PCT/FR2005/051072 entitled "Improved Gamma Imaging Device", which was filed on Dec. 12, 2005, which was not published in English, and which claims priority of the French Patent Application Nos. 04 52962 filed Dec. 14, 2004.

TECHNICAL FIELD

This invention relates to an improved gamma imagery device.

STATE OF PRIOR ART

Gamma imagery devices have been developed since the 1990s with the objective of remotely determining the location of radioactive gamma radiation sources, in other words sources that emit gamma radiation. These gamma imagery devices include a gamma camera.

The operating principle of a gamma camera is well known: a scintillator receives gamma photons from the gamma radiation source, and it produces a light signal that is amplified and generally detected by a charge coupled device (CCD) associated with processing means. The charge coupled device positions the gamma radiation emitted by the gamma radiation source and that had interacted with the scintillator. Such gamma cameras are relatively sensitive and high performance.

In general, two images are superposed, firstly the image of the gamma radiation source corresponding to the gamma radiation received by the gamma camera and secondly a visible image of the observed scene acquired either by the gamma camera itself, or by a colour camera associated with the gamma camera. The gamma radiation image received by the scintillator usually appears in false colours. The visible image of the observed scene when it is acquired by the gamma camera is black and white.

Such gamma imagery devices are capable of determining the location of gamma radiation sources in space, which makes them particularly suitable for preparation of work such as maintenance, dismantling or inspection operations, to be done in an irradiating medium.

Furthermore, some of these gamma imagery devices can be used for quantification of dose rates due to an image analysis, provided that some assumptions are made particularly about the energy of the incident gamma radiation.

However, if it is required to identify and quantify the radioelements responsible for gamma radiation, then a spectrometry instrument is necessary capable of measuring the energy of emitted gamma photons and counting their number during a certain time interval. This spectrometry instrument and the imagery device are not usually used simultaneously. Furthermore, when they are used successively or simultaneously, it is never certain that they will aim at exactly the same location, which means that the two series of measurements are not correlated. Therefore, when spectrometry measurements are made, we do not know if the energy was collected from the same radioelements as those localised by the imagery device. The conclusions drawn from these measurements could be wrong.

PRESENTATION OF THE INVENTION

The purpose of this invention is to overcome the disadvantages according to prior art.

More precisely, the purpose of this invention is to disclose a gamma imagery device designed to remotely determine the location of a gamma radiation source and that can characterise radioelements responsible for the gamma radiation emitted by the gamma radiation source so as to improve the precision of the measurements made.

To achieve this, this invention relates to a gamma imagery device including a gamma camera with an observation field that extends around an axis. It also includes:

a gamma spectrometry detector collimated with a collimator with an observation field extending around an axis and that is included in the observation field of the gamma camera beyond a given distance from it, a laser pointer with a line of sight, this laser pointer being located close to the gamma spectrometry collimator, such that the line of sight is parallel to the line of the observation field of the collimator and intersects the observation field of the collimator, means of detecting a zone pointed at by the laser pointer.

It is preferable for the laser pointer to be fixed to the gamma spectrometry collimator, so as to improve the characterisation precision.

It is even possible that the laser pointer is included in the gamma spectrometry collimator.

The laser pointer can emit in a visible or near visible range.

Means of detecting the zone pointed at by the laser pointer may be formed by the gamma camera.

Means of detecting the zone pointed at by the laser pointer may be formed by an additional camera, the laser pointer emitting radiation to which the additional camera is sensitive. This construction may for example correspond to the case in which the gamma camera is a coded mask camera.

The additional camera has an observation field similar to the observation field of the gamma camera.

Preferably, the observation field of the collimator is restricted to improve the selectivity, and it covers between about a tenth and a quarter of the observation field of the gamma camera.

The gamma camera may be a pinhole camera or a coded mask camera.

In order to facilitate assembly of the device, the observation field of the gamma camera may extend around an axis that is substantially parallel to the axis of the observation field of the gamma spectrometry collimator and to the line of sight of the laser pointer.

In the presence of the additional camera, its observation field may extend around an axis that is substantially parallel to the axis of the observation field of the gamma spectrometry collimator and to the line of sight of the laser pointer.

It is preferable to make the collimator from a material with a density greater than the density of steel.

It is preferable if the gamma spectrometry detector is as compact as possible, to limit the dimensions of the device.

The given distance is preferably of the order of one meter.

This invention also relates to a method of using the gamma imagery device thus characterised.

It consists of:

localising a gamma radiation source with the gamma camera, this source emitting gamma radiation with an energy spectrum, orienting the imagery device such that the laser pointer points at a zone corresponding to the gamma radiation source or to a part of the gamma radiation source, checking that the orientation is correct, by the detection means taking a photo of the zone pointed at by the laser pointer, acquiring the energy spectrum of the gamma radiation emitted by the gamma radiation source thus localised, using the gamma spectrometry detector.

BRIEF DESCRIPTION OF THE DRAWINGS

This invention will be better understood after reading the description of example embodiments given purely for information and that are in no way limitative, with reference to the appended drawings in which.

Identical, similar or equivalent parts on the different figures described below are marked with the same numerical references so as to facilitate comparison between one figure and another.

The different parts shown in the figures are not necessarily at the same scale, to make the figures more easily readable.

DETAILED PRESENTATION OF PARTICULAR EMBODIMENTS

Figure 1:
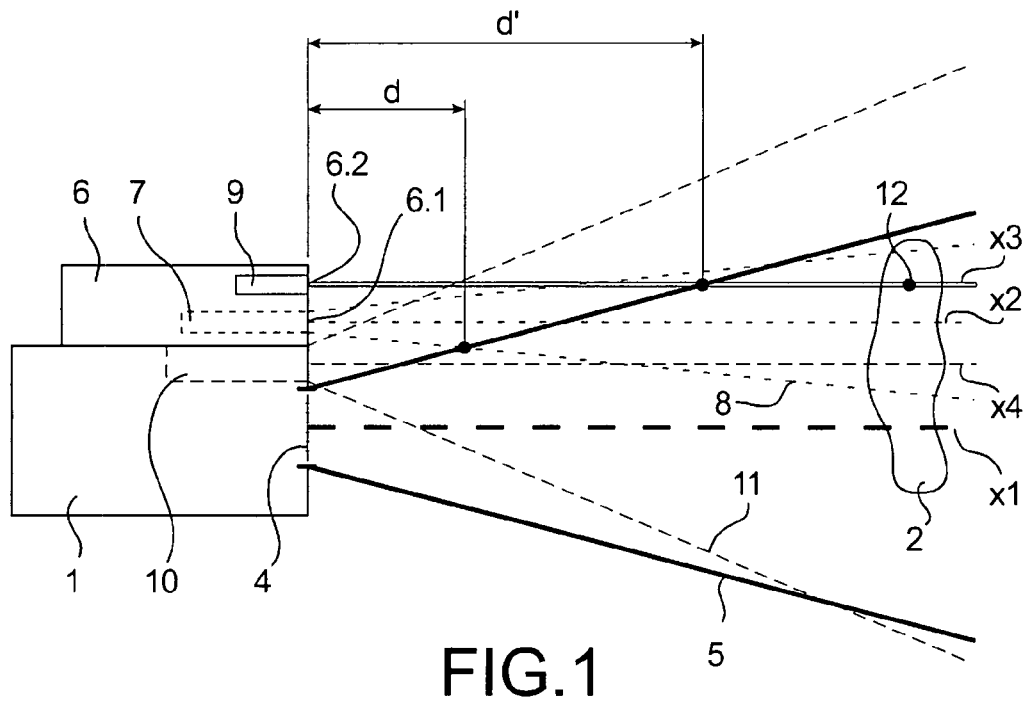
FIG. 1 shows a longitudinal sectional view of an example of the gamma imagery device according to the invention.
Figure 2:
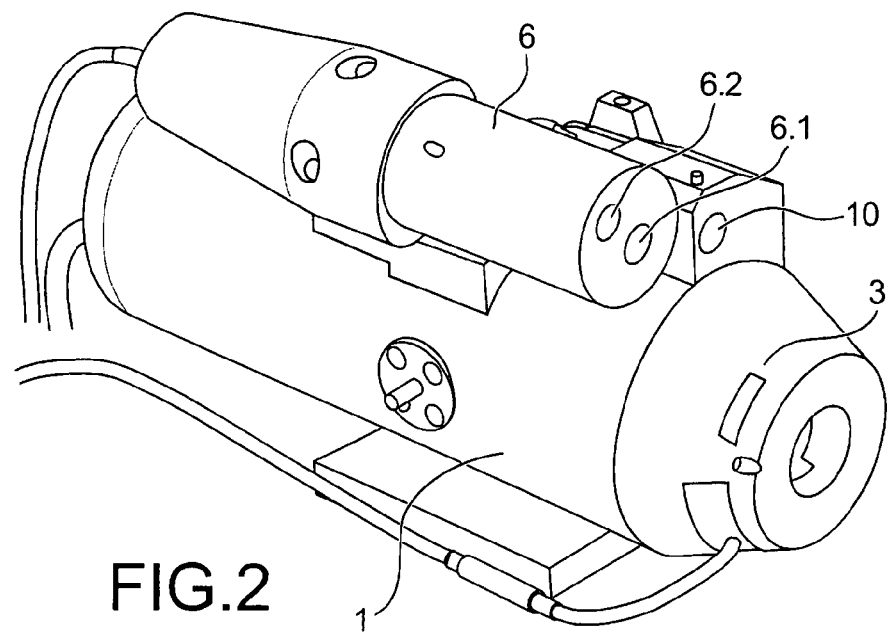
FIG. 2 shows another example of a gamma imagery device according to the invention, in three dimensions.

Refer to FIG. 1 that shows a longitudinal sectional view of an example of an improved gamma imagery device according to the invention, and FIG. 2 that shows another example of an improved gamma imagery device according to the invention in three dimensions.

The gamma imagery device includes a gamma camera 1. It is designed to determine the position of gamma radiation sources. One of them is marked as reference 2 in FIG. 1.

This gamma camera 1 may be of any type, for example it may have a pinhole type collimator 3 as shown diagrammatically in FIG. 2 to collect gamma photons from the gamma radiation source 2. As a variant, it may have collimation of gamma photons by a coded mask opening 4 as shown diagrammatically in FIG. 1.

The gamma camera 1 has an observation field 5 extending around an axis x1. In the variant without coded mask, this gamma camera 1 can acquire a visible image of scenes located in its observation field 5 and therefore of the gamma radiation source 2. This image is a monochrome (black and white) image.

The imagery device also includes a gamma spectrometry collimator 6, in which a gamma spectrometry detector 7 is placed. The gamma spectrometry collimator 6 is made of a dense material, and its density will be greater than the density of steel. For example, this material may be based on lead and/or tungsten and/or copper. The collimator 6 is fixed to the gamma camera 1.

The aperture 6.1 of the gamma spectrometry collimator 6 leads to an observation field 8 that is included in the observation field 5 of the gamma camera 1 beyond a given distance d from the gamma camera 1. The distance d is of the order of one meter.

The gamma spectrometry detector 7 is facing the opening 6.1 of the gamma spectrometry collimator 6.

The observation field 8 of the gamma spectrometry collimator 6 extends around an axis x2. Advantageously (because it is simple to achieve), it is preferable if the axis x2 of the observation field 8 of the gamma spectrometry collimator 6 is substantially parallel to the x1 axis of the observation field 5 of the gamma camera 1. For selectivity reasons, it is preferable if the observation field 8 of the gamma spectrometry collimator 6 is smaller than the observation field 5 of the gamma camera 1. The observation field 8 of the gamma spectrometry collimator 6 may for example be between about a tenth and a quarter of the observation field 5 of the gamma camera 1.

Preferably, the gamma spectrometry detector 7 is as compact as possible so that the imagery device according to the invention remains as compact as possible.

Gamma spectrometry detectors are well known instruments and they have an active part with which gamma photons interact during detection. This active part may be made of scintillation crystals, for example such as sodium iodide doped with thallium or based on semiconductors for example such as CdZnTe. The use of compact gamma spectrometry detectors based on CdZnTe is usually very satisfactory. The gamma spectrometry detector is designed to cooperate with processing means (not shown) processing signals output by the gamma spectrometry detector.

The gamma imagery device according to the invention also includes a laser pointer 9. This laser pointer 9 is located close to the gamma spectrometry detector 7. It is coupled with the gamma spectrometry collimator 6. It may be placed inside the gamma spectrometry collimator 6 or outside.

The laser pointer 9 may be fixed directly to the gamma camera 1. As a variant, it may be fixed to the gamma spectrometry collimator 6.

When the gamma spectrometry collimator 6 houses the laser pointer 9, it comprises a second opening 6.2 facing the laser pointer 9. The laser pointer 9 has a line of sight x3 that must be parallel to the axis x2 of the observation field 8 of the gamma spectrometry collimator 6. The proximity characteristic between the gamma spectrometry detector 7 and the laser pointer 9 and parallelism between the line of sight x3 and the axis x2 of the observation field 8 of the gamma spectrometry collimator 6 are required for optimum operation of the gamma imagery device according to the invention.

Thus, at a given distance d' from the laser pointer 9, the line of sight x3 of the laser pointer 9 intersects the observation field 8 of the gamma spectrometry collimator 6. This distance d' may be different from the distance d. This distance d' is typically more than about 1 meter. In this way, the line of sight x3 of the laser pointer 9 also intersects the observation field 5 of the gamma camera 1.

In the gamma imagery device according to the invention, it would also be possible for the detection means 1, 10 to be capable of detecting a zone 12 pointed at by the laser pointer 9. The wavelength of the laser pointer 9 is compatible with said detection means 1, 10. These detection means 1, 10 may be materialised by the gamma camera 1 itself. We have seen above that some gamma cameras have a visible or near visible view taking function. Images taken by these cameras are in black and white, but this does not create any problem.

As a variant, the detection means 1, 10 may be formed by an additional visible or near visible camera 10 (for example an infrared camera). This additional camera 10 has an observation field 11 that extends around an axis x4. The additional camera 10 is fixed to the gamma camera 1, such that their observation fields 5, 11 are close to each other. The additional camera 10 has been shown in FIG. 2 adjacent to the gamma spectrometry collimator 6. Advantageously, the wavelength chosen for the laser pointer 9 will be in the visible or near visible. Note again that gamma coded mask cameras cannot provide visible images and in this case the additional camera 10 comes into its own.

The laser pointer 9 will point at a zone 12 of the radiation source 2. This zone 12 will be detected by detection means 1, 10, in other words the gamma camera 1 and/or the additional camera 10, by being located in their corresponding observation fields 5, 11. If the gamma camera 1 detects the zone 12 pointed at by the laser pointer 9, it is quite clear that the line of sight x3 of the laser pointer 9 intersects the observation field 5 of the gamma camera 1. In this case, the image of the zone 12 acquired by the gamma camera is not a colour image, but rather is black and white. This does not create any problem, because the brightness produced by the laser pointer 9 enables unambiguous display of zone 12. If the additional camera 10 detects the zone 12 to which the laser pointer 9 is pointing, then the line of sight x3 must intersect the observation field 11 of the additional camera 10.

One advantageous and particularly easy-to-make construction is to make the axes x1, x2, x4 of the observation fields 5, 8, 11 of the gamma camera 1, the gamma spectrometry collimator 6 and the additional camera 10 (if there is one), parallel to each other and parallel to the line of sight x3 of the laser pointer 9. This configuration is shown in FIGS. 1 and 2.

We will now describe the method of using the gamma imagery device according to the invention.

A gamma radiation source 2 is localised using the gamma camera 1. The imagery device is oriented such that the laser pointer 9 points at a zone 12 corresponding to the gamma radiation source 2 or part of the gamma radiation source in the case of a wide source.

It is checked that the orientation of the laser pointer 9 is correct by taking a view of the zone 12 pointed at by the laser pointer, using the detection means 1, 10.

If the proximity conditions of the laser pointer 9 and the gamma spectrometry collimator 6 and the parallelism between their axes x2, x3 are respected, then the gamma radiation source 2 or part of this source is located in the observation field 8 of the gamma spectrometry collimator 6.

The next step is to use the gamma spectrometry detector 7 to acquire the gamma radiation energy spectrum emitted by the gamma radiation source 2 thus localised. The gamma spectrometry detector 7 outputs a pulsed current, the amplitude of which is proportional to the energy that it absorbed, in other words the energy of gamma photons that it received from the radiation source. These pulses are dealt with as a function of their amplitude in multi-channel analyser type processing means. The result is an energy spectrum with photoelectric peaks giving the number of pulses as a function of the gamma radiation energy.

According to principles commonly set up in spectrometry, the analysis of photoelectric peaks obtained on the spectrum provides a means of identifying the main radioelements that emit gamma photons responsible for irradiation.

The laser pointer 9 forms the link between spatial information, in other words the position of the localised zone on the gamma radiation source to be localised and identified, and the spectral information, in other words the energy spectrum of the gamma radiation emitted by the source. This laser pointer can guide displacement of the gamma imagery device according to the invention and make sure that the gamma spectrometry collimator correctly "observes" the gamma radiation source 2 localised by the gamma camera.

The gamma imagery also provides information about the extent of the gamma radiation source, this information can be used during analysis of the energy spectrum, particularly when it is desired to evaluate the activity of the source.

The association of gamma imagery and gamma spectrometry within the device has two advantages. Firstly, the results supplied by gamma imagery indicate the strongest radiation sources in an environment that it is desirable to characterise by gamma spectrometry. Secondly, gamma imagery provides information about the extent of the irradiating zone that can be taken into account during interpretation of the measurement made by gamma spectrometry, particularly when it is required to evaluate the activity of the radiation source using the measured energy spectrum. This evaluation assumes that assumptions are made about the spatial distribution of the radiation source, information given by gamma imagery.

Although several embodiments of this invention have been represented and described in detail, it can be understood that different changes and modifications can be made without going outside the framework of the invention.

The invention claimed is:

1. Gamma imagery device including a gamma camera with an observation field, wherein the device comprises:
   a gamma spectrometry detector collimated with a collimator with a first observation field extending around an axis and that is included in a second observation field of the gamma camera beyond a given distance from the gamma camera;
   a laser pointer with a line of sight, the laser pointer being located close to the gamma spectrometry collimator, such that the line of sight is parallel to the axis of the first observation field of the collimator and intersects the first observation field of the collimator; and
   means for detecting a zone pointed at by the laser pointer, in that the gamma camera is a pinhole camera or a coded mask camera.

2. Gamma imagery device according to claim 1, in which the laser pointer is fixed to the gamma spectrometry collimator.

3. Gamma imagery device according to claim 1, in which the laser pointer is included in the gamma spectrometry collimator.

4. Gamma imagery device according to claim 1, in which the laser pointer emits in a visible or near visible range.

5. Gamma imagery device according to claim 1, in which means for detecting the zone pointed at by the laser pointer are formed by the gamma camera.

6. Gamma imagery device according to claim 1, in which means for detecting the zone pointed at by the laser pointer are formed by an additional camera, the laser pointer emitting radiation to which the additional camera is sensitive.

7. Gamma imagery device according to claim 6, in which the additional camera has a third observation field similar to the second observation field of the gamma camera.

8. Gamma imagery device according to claim 1, in which the first observation field of the collimator covers between about a tenth and a quarter of the second observation field of the gamma camera.

9. Gamma imagery device according to claim 1, in which the second observation field of the gamma camera extends around an axis that is substantially parallel to the axis of the first observation field of the gamma spectrometry collimator and to the line of sight of the laser pointer.

10. Gamma imagery device according to claim 7, in which the third observation field of the additional camera extends around an axis that is substantially parallel to the axis of the first observation field of the gamma spectrometry collimator and to the line of sight of the laser pointer.

11. Gamma imagery device according to claim 1, in which the collimator is made of a material with a density greater than the density of steel.

12. Gamma imagery device according to claim 1, in which the gamma spectrometry detector is compact.

13. Gamma imagery device according to claim 1, in which the distance is of the order of 1 meter.

14. Method of using the gamma imagery device according to claim 1, comprising the following steps:
   localise a gamma radiation source with the gamma camera, this source emitting gamma radiation with an energy spectrum;
   orient the imagery device such that the laser pointer points at a zone corresponding to the gamma radiation source or to a part of the gamma radiation source;
   check that the orientation is correct, by the detection means taking a photo of the zone pointed at by the laser pointer;
   acquire the energy spectrum of the gamma radiation emitted by the gamma radiation source thus localised, using the gamma spectrometry detector.

15. Gamma imagery device according to claim 2, in which the laser pointer is included in the gamma spectrometry collimator.

* * * * *